United States Patent
Eggert

(10) Patent No.: US 10,048,858 B2
(45) Date of Patent: Aug. 14, 2018

(54) METHOD AND APPARATUS FOR SWIPE SHIFT PHOTO BROWSING

(71) Applicant: NOKIA CORPORATION, Espoo (FI)

(72) Inventor: Jens Eggert, Helsingborg (SE)

(73) Assignee: Nokia Technologies Oy, Espoo (FI)

( * ) Notice: Subject to any disclaimer, the term of this patent is extended or adjusted under 35 U.S.C. 154(b) by 390 days.

(21) Appl. No.: 14/439,807

(22) PCT Filed: Nov. 6, 2012

(86) PCT No.: PCT/FI2012/051083
§ 371 (c)(1),
(2) Date: Apr. 30, 2015

(87) PCT Pub. No.: WO2014/072568
PCT Pub. Date: May 15, 2014

(65) Prior Publication Data
US 2015/0277749 A1    Oct. 1, 2015

(51) Int. Cl.
G06F 3/0488  (2013.01)
G06F 3/0485  (2013.01)
G06F 3/01    (2006.01)
G06F 3/0484  (2013.01)

(52) U.S. Cl.
CPC .......... G06F 3/04883 (2013.01); G06F 3/017 (2013.01); G06F 3/0485 (2013.01); G06F 3/04842 (2013.01)

(58) Field of Classification Search
CPC ......... G06F 3/0488; G06F 3/01; G06F 3/0484
See application file for complete search history.

(56) References Cited

U.S. PATENT DOCUMENTS

| | | |
|---|---|---|
| 2010/0066840 A1 | 3/2010 | Asukai et al. |
| 2010/0125786 A1 | 5/2010 | Ozawa et al. |
| 2011/0149138 A1 | 6/2011 | Watkins et al. |
| 2011/0202880 A1 | 8/2011 | Kawana et al. |
| 2012/0131463 A1* | 5/2012 | Lefler ............... G06F 3/0483 715/730 |
| 2012/0141095 A1 | 6/2012 | Schwesinger et al. |

(Continued)

FOREIGN PATENT DOCUMENTS

| | | |
|---|---|---|
| CN | 101617339 | 12/2009 |
| CN | 101739206 | 6/2010 |

(Continued)

OTHER PUBLICATIONS

Extended European Search Report for European Patent Application No. 12888210.7, dated May 11, 2016, 11 pages.

(Continued)

*Primary Examiner* — David Choi
(74) *Attorney, Agent, or Firm* — Locke Lord LLP

(57) ABSTRACT

A method and apparatus for swipe shift photo browsing, wherein a first image is displayed on a touch sensitive display, a transition for the first image and an adjacent image is automatically created or determined, a swipe gesture of the user is recognized with the touch sensitive display, and the image shown on the display is shifted. The shifting comprises displaying the transition of the first image and of a second image synchronized with the speed and direction of the swipe, wherein the second image is the adjacent image.

17 Claims, 3 Drawing Sheets

(56) References Cited

U.S. PATENT DOCUMENTS

| | | | | |
|---|---|---|---|---|
| 2012/0262462 | A1* | 10/2012 | Montan | G06F 3/0488 345/473 |
| 2013/0204862 | A1* | 8/2013 | Marchiori | G06F 17/30554 707/722 |
| 2014/0015827 | A1* | 1/2014 | Rapoport | G06T 11/60 345/419 |
| 2015/0277749 | A1* | 10/2015 | Eggert | G06F 3/04883 715/863 |

FOREIGN PATENT DOCUMENTS

| | | |
|---|---|---|
| GB | 2411537 | 8/2006 |
| WO | WO00/70486 | 11/2000 |
| WO | WO2012/071435 | 5/2012 |

OTHER PUBLICATIONS

English Language Machine Translation of Chinese Patent Application Publication No. CN101617339, published on Dec. 30, 2009, 47 pages.
English Language Machine Translation of Chinese Patent Application Publication No. CN101739206, published on Jun. 16, 2010, 75 pages.
International Search Report for International Application No. PCT/FI2012/051083—Date of Completion of Search: Aug. 6, 2013, 4 pages.
PCT Written Opinion of the International Searching Authority for International Application No. PCT/FI2012/051083—Date of Completion of Opinion: Aug. 6, 2013, 7 pages.

* cited by examiner

METHOD AND APPARATUS FOR SWIPE SHIFT PHOTO BROWSING

TECHNICAL FIELD

The present application generally relates to swipe shift photo browsing.

BACKGROUND

In digital imaging, videos and images are formed with very different objectives. Sometimes, a still image does not capture the moment or relay the desired or artistic effect for later viewing. It may be that a still image is not enough to reflect the action of a moment. Moving pictures or video footage is indeed often a more lively way to capture memories. There are also other ways to convey a particular feeling or moment with taken images or videos, e.g. by editing the image.

The images, or videos, are typically reviewed or displayed after they have been captured, e.g. for artistic effect, for later review of memorable moments or to be published for example in digital or social media. Browsing digital images, like browsing a traditional photo album, can be a rewarding experience and enliven the captured moments.

SUMMARY

Various aspects of examples of the invention are set out in the claims.

According to a first example aspect of the present invention, there is provided an apparatus, comprising:
  a touch sensitive display;
  a memory configured to store images; and
  a processor configured to cause:
  displaying a first image on the touch sensitive display;
  automatically determining and/or creating a transition for the first image and an adjacent image;
  recognizing a swipe gesture of the user with the touch sensitive display; and
  shifting the image shown on the display; wherein
  the shifting comprises displaying the transition of the first image and of a second image synchronized with the speed and direction of the swipe, wherein the second image is the adjacent image.

The processor may be configured to cause automatically determining and/or creating a transition for at least two adjacent images, wherein the second image is one of the adjacent images.

The apparatus may further comprise a camera unit, and the processor may further be configured to cause capturing of images with the camera unit.

An image stored in the memory may comprise or be linked with transition data, and the processor may be configured to cause the determining and/or creating the transition based on the transition data.

The processor may further be configured to cause retrieving an existing transition from the memory.

According to a second example aspect of the present invention, there is provided a method, comprising:
  displaying a first image on a touch sensitive display;
  automatically determining and/or creating a transition for the first image and an adjacent image;
  recognizing a swipe gesture of the user with the touch sensitive display; and
  shifting the image shown on the display; wherein
  the shifting comprises displaying the transition of the first image and of a second image synchronized with the speed and direction of the swipe, wherein the second image is the adjacent images.

The method may further comprise automatically determining and/or creating a transition for at least two adjacent images, wherein the second image is one of the adjacent images.

The method may further comprise capturing an image with a camera unit.

The method may further comprise determining and/or creating the transition based on transition data comprised in or linked with an image stored in a memory.

The method may further comprise retrieving an existing transition from the memory.

Displaying the transition may comprise sliding the image out of or into the display synchronized with the speed and direction of the swipe.

Displaying the transition may comprise sliding the image into the display synchronized with the speed and direction of the swipe and blending into at least one edited version of the image as the image is fully on the display.

Displaying the transition may comprise sliding a linked image into the display synchronized with the speed and direction of the swipe and blending into the image as the linked image is fully on the display.

Displaying the transition may comprise sliding the image into the display synchronized with the speed and direction of the swipe and concurrently synchronized with the speed and direction of the swipe playing a sequence of images, wherein the image is a part of the sequence of images, and blending into an image of the sequence of images as the image is fully on the display.

Displaying the transition may comprise sliding an image into the display synchronized with the speed and direction of the swipe and concurrently synchronized with the speed and direction of the swipe adding parts from overlapping images to the image and blending into an image combined from the overlapping images as the image is fully on the display.

Displaying the transition may comprise sliding a larger combined image into the display synchronized with the speed and direction of the swipe until the edge of the image is reached.

Displaying the transition may comprise switching into a map view and zooming in or out of the map and from or to the location the image was captured at and blending to the image as the map view is fully on the display.

According to a third example aspect of the present invention, there is provided a computer program comprising computer code for causing performing the method of the second example aspect when executed by an apparatus.

According to a fourth example aspect of the present invention, there is provided a memory medium comprising the computer program of the third example aspect.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The foregoing embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Some example embodiments of the present invention and potential advantages are understood by referring to FIGS. 1 through 5 of the drawings.

Figure 1:
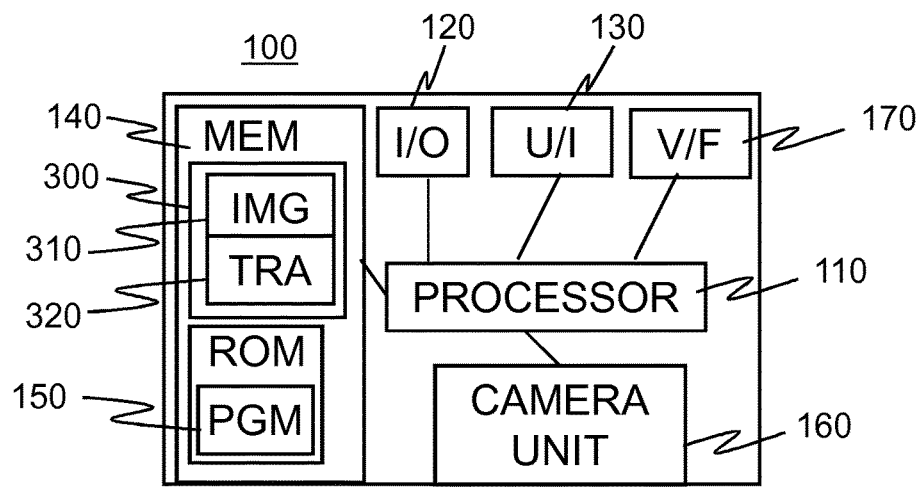
FIG. 1 shows a block diagram of an apparatus of an example embodiment of the invention.

FIG. 1 shows a block diagram of an apparatus 100 of an example embodiment of the invention. The apparatus 100 comprises a processor 110, a communication interface 120 coupled to the processor 110, and a memory 140 coupled to the processor 110. The memory 140 comprises a work memory and a non-volatile memory such as a read-only memory, flash memory, optical or magnetic memory. In the memory 140, typically at least initially in the non-volatile memory, there is stored software 150 operable to be loaded into and executed by the processor 110. The software 150 may comprise one or more software modules, applications or other forms of software and can be in the form of a computer program product that is software stored in a memory medium. In an example embodiment, images, or image files, 300 are stored in the memory 140. In an example embodiment the images 300 comprise image data 310 and transition data 320. In a further example embodiment the transition data 320 is linked to the image data 310 or comprised in or integrated with the image data 310 as a kind of metadata. The apparatus 100 further comprises a camera unit 160 and a viewfinder 170 each coupled to the processor. In an example embodiment, the apparatus 100 does not comprise a camera unit 160 or viewfinder 170 and the images 300 are transferred and stored to the memory from an external device.

Furthermore, the apparatus 100 comprises a user interface unit (U/I) 130. In an example embodiment, the user interface unit is a touch sensitive display for displaying content, e.g. images, to the user and for inputting user commands with touch of e.g. a finger and/or gestures and swipes on or in proximity of the surface of the touch sensitive display. The touch sensitive display comprises a touch sensor for detecting the touch of the user. In an example embodiment, the touch sensor comprises a resistive, a surface acoustic wave, a capacitive—such as a surface capacitance, a projected capacitance, a mutual capacitance, or self-capacitance—an infrared, an optical, a dispersive signal and/or acoustic pulse recognition touch sensor or an array thereof. A skilled person appreciates that the user interface unit, in a further example embodiment, comprises further elements such as hardware or soft buttons or further display units.

It shall be understood that any coupling in this document refers to functional or operational coupling; there may be intervening components or circuitries in between coupled elements.

The communication interface module 120 is configured to provide local communications over one or more local links. The links may be wired and/or wireless links. The communication interface 120 may further or alternatively implement telecommunication links suited for establishing links with other users or for data transfer (e.g. using the Internet). Such telecommunication links may be links using any of: wireless local area network links, Bluetooth, ultra-wideband, cellular or satellite communication links. The communication interface 120 may be integrated into the apparatus 100 or into e.g. an adapter or card that may be inserted into a suitable slot or port of the apparatus 100. While FIG. 1 shows one communication interface 120, the apparatus may comprise a plurality of communication interfaces 120.

The processor 110 is, for instance, a central processing unit (CPU), a microprocessor, a digital signal processor (DSP), a graphics processing unit, an application specific integrated circuit (ASIC), a field programmable gate array, a microcontroller or a combination of such elements. FIG. 1 shows one processor 110, but the apparatus 200 may comprise a plurality of processors.

As mentioned in the foregoing, the memory 140 may comprise volatile and a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or any combination thereof. In some example embodiments, only volatile or non-volatile memory is present in the apparatus 100. Moreover, in some example embodiments, the apparatus comprises a plurality of memories. In some example embodiments, various elements are integrated. For instance, the memory 140 can be constructed as a part of the apparatus 100 or inserted into e.g. a slot or port. Further still, the memory 140 may serve the sole purpose of storing data, or it may be constructed as a part of an apparatus serving other purposes, such as processing data. Similar options are thinkable also for various other elements.

A skilled person appreciates that in addition to the elements shown in FIG. 1, the apparatus 100 may comprise other elements, such as microphones, displays, as well as additional circuitry such as further input/output (I/O) circuitries, memory chips, application-specific integrated circuits (ASIC), processing circuitry for specific purposes such as source coding/decoding circuitry, channel coding/decoding circuitry, ciphering/deciphering circuitry, or any combination thereof. Additionally, the apparatus 100 may comprise a disposable or rechargeable battery (not shown) for powering the apparatus when external power if external power supply is not available.

It is also useful to realize that the term apparatus is used in this document with varying scope. In some of the broader claims and examples, the apparatus may refer to only a subset of the features presented in FIG. 1 or even be implemented without any one of the features of FIG. 1. In one example embodiment term apparatus refers to the processor 110, with an input for the processor 110 configured to receive information from the camera unit and an output for the processor 110 configured to provide information to the camera unit.

Figure 2:
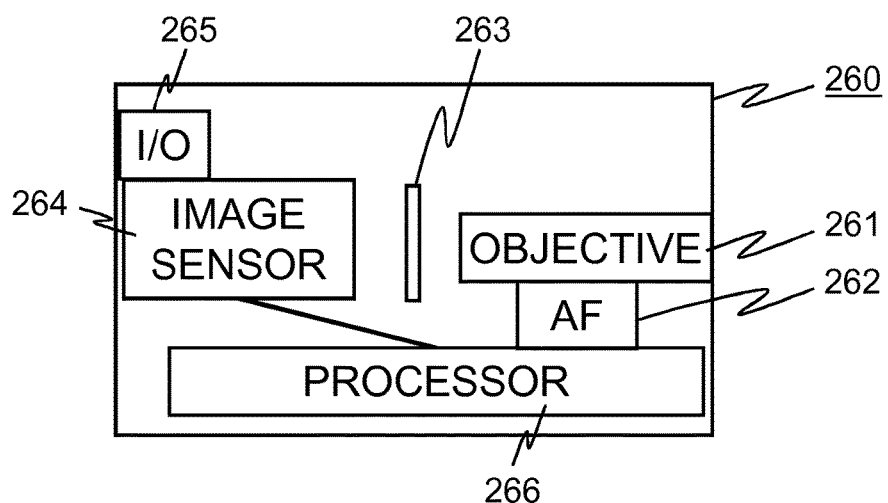
FIG. 2 shows a block diagram of a camera unit of an example embodiment of the invention.

FIG. 2 shows a block diagram of a camera unit 260 of an example embodiment of the invention. The camera unit 260 is capable of capturing video and still images and comprises an objective 261, an autofocus unit 262 configured to adjust focusing of the objective 261, an optional mechanical shutter 263, an image sensor 264 and an input and/or output 265. The camera unit 260 further comprises, in one example embodiment, further processor 266, hereinafter referred to as the camera processor, communicatively connected to the autofocus unit 262 and to the image sensor 264. When implemented, the camera processor 266 can participate in creating image transitions and in processing images 300 within the camera unit 260. The camera processor can be any type of a processor e.g. such as the alternatives described with reference to FIG. 1. Furthermore, a skilled person appreciates that in addition to the elements shown in FIG. 2, the camera unit 260 may comprise other elements, such as a zoom unit, image stabilization unit and further circuitry.

A skilled person appreciates that the apparatus 100 is in an example embodiment a mobile device, a mobile phone, a smartphone, a digital camera, a portable gaming device, a tablet computer, a laptop computer, a personal computer, a digital photo frame or any combination thereof.

Figure 3:
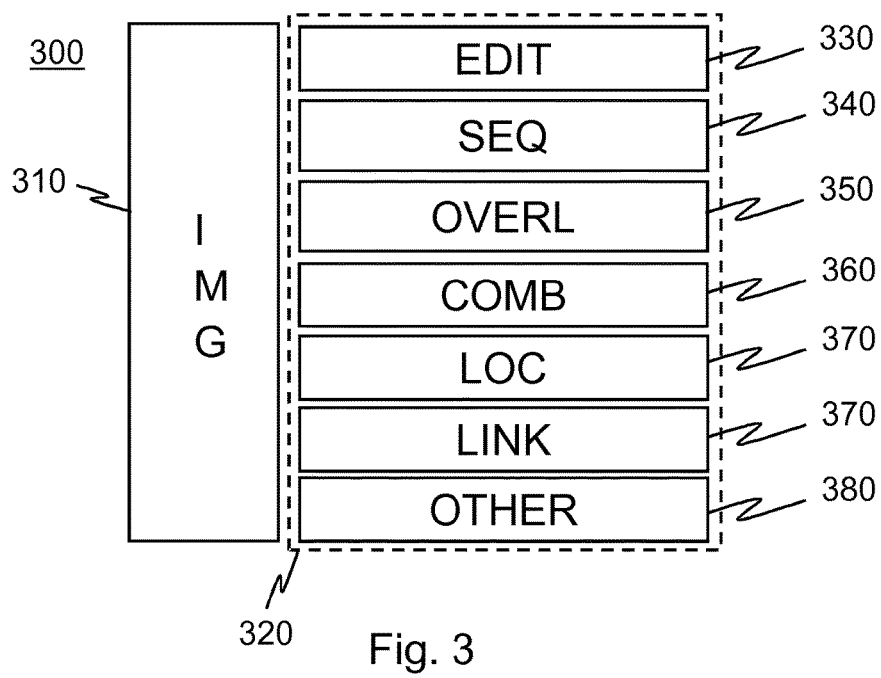
FIG. 3 shows a schematic block representation of an image file used in an example embodiment of the invention.

FIG. 3 shows a schematic block representation of an image, or image file, 300 used in an example embodiment of the invention. The image file comprises image data 310 and transition data 320. The transition data 320 is linked to the image data 310 or comprised in or integrated with the image data 310 as a kind of metadata. In a further example embodiment the transition data 320 comprises different types of data, for example information 330 on an edited image being available, information 340 on the image being a part of a sequence of images, information 350 on overlapping images being available, information 360 on a combined image being available, information 370 on the location the image was captured in, information 370 linking the image to another image e.g. in an online service, and/or further transition information 380. In an example embodiment, the transition data is created when the image file 300 is created or stored into the memory 140. In a further example embodiment, the transition data is created or updated when needed, e.g. when an edited version of the original image is created, or a sequence of images comprising the original image is created. In a further example embodiment, the transition data is edited by a user or the transition data is created when the image is viewed for the first time using swipe shift photo browsing according to an example embodiment.

Figure 4:
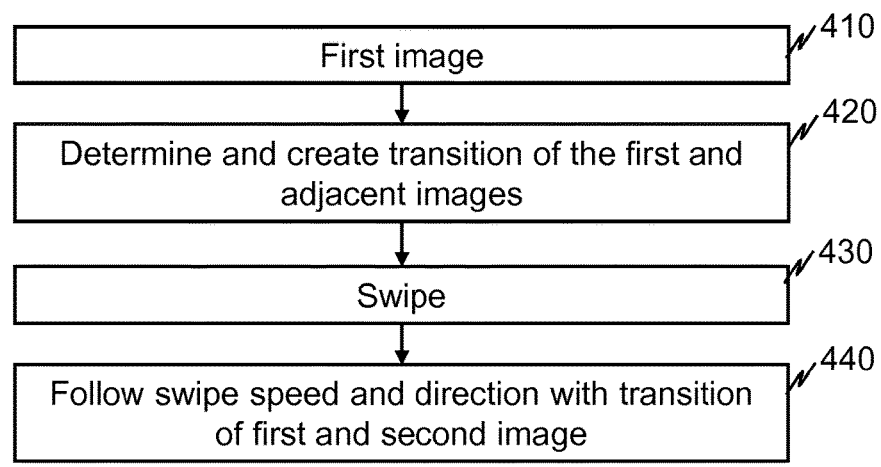
FIG. 4 shows a flow chart illustrating basic operations of swipe shift photo browsing method according to an example embodiment of the invention.

FIG. 4 shows a flow chart illustrating basic operations in a process of the swipe shift photo browsing according to an example embodiment. The photos, or images, 300 are displayed e.g. in a photo browser application on the touch sensitive display 130 of the apparatus 100. A first image is displayed as the photo browsing is started 410. A skilled person appreciates that the first image, in an example embodiment, is for example the image that was most recently captured, the image that was last viewed, the oldest image, the image corresponding to the current location of the apparatus 100 or an image chosen according to any criteria, e.g. by preferences set by the user of the apparatus 100.

At 420 as the first image is being displayed, or immediately as the first image is displayed, the transition data 320 for the first image is checked and the image transition for the first image is determined and/or created. Furthermore, the transition data 320 of images adjacent to the first image, i.e. the next and previous image in the photo browser, or the memory 140, is checked and the image transition for the adjacent images is determined and/or created. The determining and/or creating the transition for an image is explained hereinafter with reference to FIG. 5. In an example embodiment, each image has one or more possible transitions, depending on the transition data 320. In a further example embodiment, the transition that is determined or created is chosen in accordance with user preferences or at random. In a further example embodiment, a different transition is selected for each or some occasions when the image is displayed.

At 430 the user of the apparatus 100 indicates her wish to view the next image, i.e. to switch to the image adjacent to the first image. A skilled person appreciates that in an example embodiment the photo browser displaying the images handles the images in a kind of endless loop, i.e. the user of the apparatus may move to either direction from each displayed image. The user of the apparatus 100 indicates her wish to view the next image e.g. with the user interface by swiping the touch sensitive display with her finger, i.e. by moving her finger on the touch sensitive display 130. The touch sensitive display recognizes or detects the direction and speed of the swipe, i.e. detects the position of the finger during the swipe gesture on the screen or in proximity thereof. While swiping can thus be performed by moving a finger on the screen or in the proximity of the screen, the swiping can alternatively be performed according to a further example embodiment by using e.g. a pointing device.

At 440 the image being displayed on the touch sensitive display is shifted in accordance with, or synchronized with the swiping gesture. During the shift, the transition of both images is displayed synchronized with the speed and direction of the swipe gesture. In a further example embodiment, the position of the finger on the touch sensitive display is used to control the transition in addition or alternative to the speed and/or direction. The transitions according to example embodiments are explained in detail hereinafter with reference to FIG. 5. In an example embodiment the user changes the direction of the swipe during the shift and the direction that the images slide and the direction of the transitions being displayed is changed accordingly, i.e. the user can choose to return to the first image after having seen a part of the second image on the display. The transition being displayed during the shift follows the swipe gesture independent of the direction of the shift. In a further example embodiment, the user releases her finger from the touch sensitive display during the swipe before the transition is completed. In an example embodiment, in such a case the transition is completed automatically with for example a predetermined speed. In a further example embodiment, depending on how far the transition has proceeded, the transition is either completed automatically or the direction of the transition is reversed and the first image is returned to the display. Furthermore, a skilled person appreciates that in a further example embodiment, the transitions are displayed also when the images are shifted automatically, for example in an automatic slide show mode.

In an example embodiment, the first image slides away from the display and the second image, i.e. one of the images adjacent to the first image, slides into the display synchronized with the swipe movement, i.e. the direction and speed of the swipe. In an example embodiment, the first image slides away in the direction of the swipe and the second image slides into the display in the direction of the swipe, or as if being pulled into the display by the finger. During the shift, a part of both images is displayed, as the first image slides away and the second image slides into the display. On shifting the first and second images, while synchronized with the swipe movement, the speed of the first and second images can be slightly changed in one example embodiment e.g. so that the first image appears to move first and pull or push the second image with some elasticity so that the distance of the images may at least temporarily change and/or the images may temporarily overlap.

Figure 5:
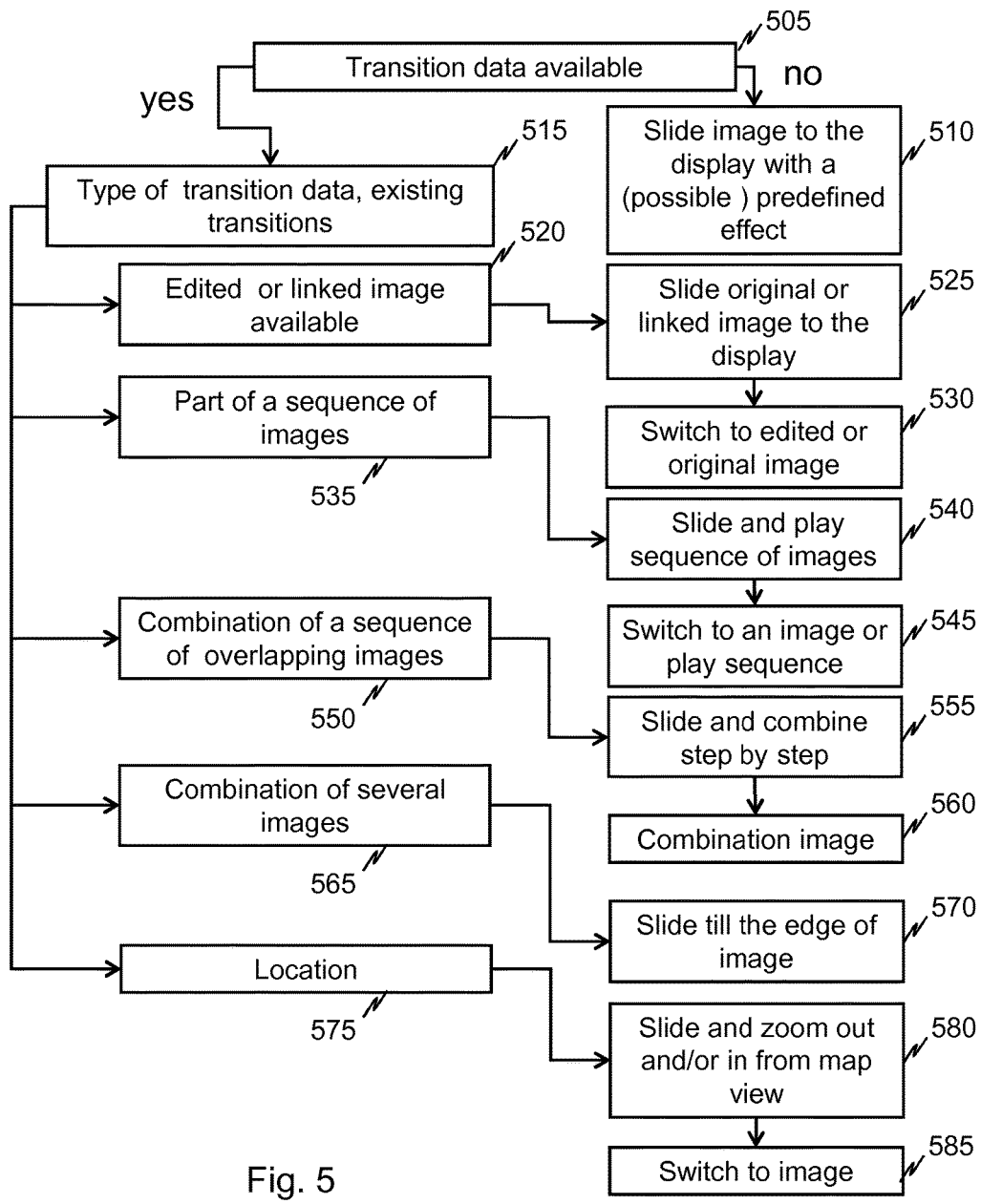
FIG. 5 shows a flow chart illustrating basic operations in determining and creating a transition of the swipe shift photo browsing method according to an example embodiment of the invention.

FIG. 5 shows a flow chart illustrating basic operations in determining and creating a transition of the swipe shift photo browsing method according to an example embodiment of the invention. The operations depicted in the flow chart are carried out for each image 300 displayed on the touch sensitive display 130 and the images adjacent to the image being displayed, as described hereinbefore. At 505 the apparatus 100 checks if transition data 320 is available on the image file or linked thereto. In an example embodiment, the transition data is created at step 320. A skilled person appreciates, that in an example embodiment, the checking and all further steps of the process are implemented for example within the photo browsing application or within a different application or software in the memory 140 and executable by the processor 110. Furthermore, all steps of the process are fully automatic, i.e. the user of the apparatus 100 need not actively participate, but can merely browse the images and enjoy the transitions. In an example embodiment, the transition or transitions that are determined and automatically created based on the transition data are stored into the memory 140 for later use, i.e. each transition needs to be created only once, and later additional transitions are created as needed if the transition data 320 of the image 300 changes. A skilled person appreciates that in an example embodiment, several transitions are available for an image and that several transitions can be combined to form a further transition to be displayed during a shift.

If an image contains no transition data, the transition that is determined is that when the image is shifted as hereinbefore described, the image with no transition data slides 510 into the display following the speed and direction of the swipe gesture as hereinbefore described and, in a further example embodiment, the transition is carried out in a conventional manner, e.g. with a blur-transfer, with a fly in-transfer, by zooming in and/or out or with a further predefined effect or with any combination thereof, again synchronized with the speed and direction of the swipe gesture.

If an image contains transition data, the type of transition data is determined at 515. In an example embodiment, the image contains several types of transition data and accordingly several types of transitions are created and stored. In a further example embodiment, the user has set preferences based on which only certain type of transitions are used and hence created. In a further example embodiment, the existing, i.e. previously created and stored, transitions are checked, and only transitions based on changed or updated transition data or changed or updated user preferences are created.

At 520 the transition data shows that an edited version of the image, for example an image with changed colors, erased objects, smiles substituting stern looks, or an airbrushed image, or a linked image, for example an image captured by another person in the same place and shared in an online service, is available. The transition that is created is that when the image is shifted as hereinbefore described, either the original image or the linked image from an online service slides 525 into the display following the speed and direction of the swipe gesture as hereinbefore described, and after the image is fully on the display, the image changes 530 into the edited image or the original image in case of the linked image sliding into the display. A skilled person appreciates, that the change into the edited or original image is in an example embodiment implemented with common blending effects instead of just switching the image. In an example embodiment, the switch from the first image to the second image is created for example with interpolated images therebetween.

Furthermore, a skilled person appreciates that in a further example embodiment, the edited image comprises further edits or adjustments of the image, not expressly mentioned, and carried out with conventional image processing tools manually or automatically during or after the capturing of the original image. Furthermore, the final or edited image, in a further example embodiment, comprises several separate edits, for example an adjustment of colors and an adjustment of facial expression, and the transition comprises showing both these edits first separately and/or showing the edited image with all the adjustments.

At 535 the transition data shows that the image is part of a sequence of images, for example a cinemagraph containing the image has been created, a parallax image has been created, or images from multiple angles have been taken from the same object. The transition that is created is that when the image is shifted as hereinbefore described, the sequence of images slides 540 into the display following the speed and direction of the swipe gesture as hereinbefore described and concurrently, again synchronized with the direction and speed of the swipe gesture, the sequence of images is played, for example the cinemagraph showing movement in a part of the picture or the sequence of images creating an animation that an object rotates on the display is repeated. After the image is fully on the display, for example the original image or one of the images of the sequence of images is shown. In a further example embodiment, after the image is fully on the display, the sequence of images is played or a further version of the sequence of images, e.g. a second cinemagraph, is played. A skilled person appreciates that the change from the sequence of images into a single image is in an example embodiment implemented with common blending effects instead of just switching the image. In a further example embodiment, the transition is created with several layers of an image with transparency, each or some layers being moved with different relative speeds while again synchronized with the direction and speed of the swipe gesture and thus creating for example a parallax effect.

At 550 the transition data shows that the image is part of a combination image, or part of an image formed from a sequence of images, for example there exists a strobe effect image showing several phases of rapid movement in one image. The transition that is created is that the first image of the series slides 555 into the display following the speed and direction of the swipe gesture as hereinbefore described and concurrently, again synchronized with the direction and speed of the swipe gesture, parts of the further images forming the combination image are added to the image. After the image is fully on the display, the completed combination image is shown 560.

At 565 the transition data shows that the image is part of a combination image larger than the original images, for example a panorama image. The transition that is created is that when the image is shifted as hereinbefore described, the combination image slides into the display and a part of the image slides away from the display as the image keeps sliding, still synchronized with the direction and speed of the swipe gesture, until the edge of the image, i.e. a cropped image from an edge of the image, is fully displayed 570. Only a part of the image, i.e. a cropped image, is shown on the display during the transition and as the image slides on the display synchronized with the direction and speed of the swipe gesture. In a further example embodiment, the image that is larger than the display area, slides in any direction, i.e. horizontal, vertical and combination thereof, again synchronized with the direction and speed of the swipe gesture.

At 575 the transition data shows that a location wherein the image was captured is available. The transition that is created is that when the image is shifted as hereinbefore described, the photo browser switches to a map view and zooms out from the location of the previous image and then zooms in to the location of the image, again synchronized with the direction and speed of the swipe gesture. After the image, or rather the map in this case is fully on the display, the view changes 530 into the image. A skilled person appreciates, that the change into image from the map view is in an example embodiment implemented with common blending effects instead of just switching the image. In an example embodiment, the map view is implemented e.g. with an application external to the photo browsing application.

Some use cases relating to given example embodiments of the swipe shift photo browsing are presented in the following. In a first use case, a user of the apparatus 100 has captured an image and subsequently edited the colors of the image for example to better correspond to the actual moment the photo was captured at viewed with human vision. As the image is browsed according to an example embodiment, first the original image slides into the display following the speed and direction of the swipe gesture and then as the image is fully shown on the display the colors blend into the edited colors.

In a second use case of the swipe shift photo browsing according to an example embodiment, a user of the apparatus 100 has captured an image with undesired objects, e.g. unrelated persons, blocking a part of the image. As the image is browsed according to an example embodiment, first the original image slides into the display following the speed and direction of the swipe gesture and then as the image is fully shown, the undesired objects vanish from the image as an edited image with the undesired objects removed is blended in.

In a third use case of the swipe shift photo browsing according to an example embodiment, a user of the apparatus 100 has captured an image of some persons, only the persons have facial expressions that are not satisfying. As the image is browsed according to an example embodiment, first the original image slides into the display following the speed and direction of the swipe gesture and then as the image is fully shown the facial expressions of the people are replaced with more appropriate expressions, e.g. smiles, as an edited image is blended in.

In a fourth use case of the swipe shift photo browsing according to an example embodiment, a user of the apparatus 100 has captured an image that is somehow linked to another image shared with the user at an online service, for example the user has captured an image in front of a famous building and her father has captured a similar image previously and shared it with the user. As the image is browsed according to an example embodiment, first the image shared at an online service slides into the display following the speed and direction of the swipe gesture and then as the image is fully shown the image blends into the image captured by the user.

In a fifth use case of the swipe shift photo browsing according to an example embodiment, a cinemagraph, i.e. a still image having a part of the image moving has been created from an image. As the image is browsed according to an example embodiment, the image or rather the cinemagraph slides into the display following the speed and direction of the swipe gesture and the cinemagraph is played concurrently, i.e. during the shift the cinemagraph moves. As the image is fully shown for example the cinemagraph stops and an image that is a part of the cinemagraph and captured by the user is shown, the cinemagraph is played again, or a different cinemagraph, for example having a different moving area, is shown.

In a sixth use case of the swipe shift photo browsing according to an example embodiment, a parallax image, i.e. a still images of the same scene from different angles leading to the objects in the foreground and in the background moving differently is created. As the image is browsed according to an example embodiment, the parallax image slides into the display following the speed and direction of the swipe gesture and the objects in the foreground and in the background move differently in accordance with the swipe gesture. As the image is fully shown an image that is a part of the parallax image and captured by the user is shown.

In a seventh use case of the swipe shift photo browsing according to an example embodiment, a user of the apparatus has captured a sequence of images of an object from different angles, for example a sequence of images has been captured in such a way that there are images taken from different angles both prior to and after the capturing of the image that is being browsed. As the image is browsed according to an example embodiment, the images from different angles are shown as an animated sequence and slide into the display following the speed and direction of the swipe gesture and an illusion of a three dimensional object is created. As the image is fully shown an image of the images from different angles is shown.

In an eight use case of the swipe shift photo browsing according to an example embodiment, a user of the apparatus has captured several overlapping images showing for example a sports move and created a combined image from the original images showing the move phase by phase. As the image is browsed according to an example embodiment, the first image of the series slides into the display following the speed and direction of the swipe gesture and concurrently the pertinent elements of the further images, i.e. the next phases of the sports move are added, or appear, to the picture. As the image is fully shown the combined image is complete and shown.

In a ninth use case of the swipe shift photo browsing according to an example embodiment, a combination image having a size larger than the original image has been created, for example a panorama image showing a 360-degrees view of a skyline of a city. As the image is browsed according to an example embodiment, the combination image slides into the display following the speed and direction of the swipe gesture until the edge of the picture is reached.

In a tenth use case of the swipe shift photo browsing according to an example embodiment, an image and a previously viewed image, have information on the location the images were captured at. As the images are browsed according to an example embodiment, the view shifts to a map view, zooms out from the location of the previously viewed image and then zooms in to the location of the image in a kind of "fly over"—view. As the map view of the image is fully shown, the view blends into the image.

Without in any way limiting the scope, interpretation, or application of the claims appearing below, a technical effect of one or more of the example embodiments disclosed herein is the simple integration of the digital imaging effects into the swipe gesture. Another technical effect of one or more of the example embodiments disclosed herein is the enhancement of the user-experience by an enlivened photo browsing experience. Another technical effect of one or more of the example embodiments disclosed herein is that the photo browsing allows the effects that enhance the memorable moments to be shown. Another technical effect of one or more of the example embodiments disclosed herein is that the photo browsing becomes alive, as the effects that the user has desired with the original moments are shown. Another technical effect of one or more of the example embodiments disclosed herein is that presentation of photographic objects is automatically modified while performing a transition between different photographic objects and the user interface efficiently enables the user to perceive information representative of plural different views without the need to perform corresponding plural different manipulations with the user interface.

Embodiments of the present invention may be implemented in software, hardware, application logic or a combination of software, hardware and application logic. The software, application logic and/or hardware may reside on the camera unit, a host device that uses the camera unit or even on a plug-in module. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, with two examples of a suited apparatus being described and depicted in FIGS. 1 and 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. If desired, user input may be received or given at any time or concurrently with other functions. Furthermore, if desired, one or more of the previously described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
    a touch sensitive display;
    a memory configured to store images; and
    a processor configured to cause:
        displaying a first image on the touch sensitive display;
        automatically determining and/or creating a transition for the first image and an adjacent image based on transition data comprised in or linked with the first image and the adjacent image, wherein the transition data comprises information selected from the group of an edited version of the respective image being available, the respective image being part of a sequence of images and the respective image being part of a combination image;
        wherein the transition comprises, when the transition data shows that an edited version of the image is available, sliding the image into the display synchronized with the speed and direction of the swipe and blending into at least one edited version of the image as the image is fully on the display; or
        wherein the transition comprises, when transition data shows that the image is part of a sequence of images, sliding the image into the display synchronized with the speed and direction of the swipe and concurrently synchronized with the speed and direction of the swipe playing a sequence of images, wherein the image is a part of the sequence of images, and blending into an image of the sequence of images as the image is fully on the display; or
        wherein the transition comprises, when the transition data shows that the image is part of a combined image, sliding a larger combined image into the display synchronized with the speed and direction of the swipe until the edge of the image is reached;
        recognizing a swipe gesture of the user with the touch sensitive display; and
        shifting the image shown on the display; wherein the shifting comprises displaying the transition of the first image and of a second image synchronized with the speed and direction of the swipe, wherein the second image is the adjacent image.

2. The apparatus according to claim 1, wherein the processor is configured to cause automatically determining and/or creating a transition for at least two adjacent images, wherein the second image is one of the adjacent images.

3. The apparatus according to claim 1, further comprising a camera unit, wherein the processor is further configured to cause capturing of images with the camera unit.

4. The apparatus according to claim 1, wherein the processor is further configured to cause retrieving an existing transition from the memory.

5. The apparatus according to claim 1, wherein displaying the transition comprises sliding the image out of or into the display synchronized with the speed and direction of the swipe.

6. The apparatus according to claim 1, wherein displaying the transition comprises sliding a linked image into the display synchronized with the speed and direction of the swipe and blending into the image as the linked image is fully on the display.

7. The apparatus according to claim 1, wherein displaying the transition comprises sliding an image into the display synchronized with the speed and direction of the swipe and concurrently synchronized with the speed and direction of the swipe adding parts from overlapping images to the image and blending into an image combined from the overlapping images as the image is fully on the display.

8. The apparatus according to claim 1, wherein displaying the transition comprises switching into a map view and zooming in or out of the map and from or to the location the image was captured at and blending to the image as the map view is fully on the display.

9. A method, comprising:
  displaying a first image on a touch sensitive display;
  automatically determining and/or creating a transition for the first image and an adjacent image based on transition data comprised in or linked with the first image and the adjacent image, wherein the transition data comprises information selected from the group of an edited version of the respective image being available, the respective image being part of a sequence of images and the respective image being part of a combination image;
    wherein the transition comprises, when the transition data shows that an edited version of the image is available, sliding the image into the display synchronized with the speed and direction of the swipe and blending into at least one edited version of the image as the image is fully on the display; or
    wherein the transition comprises, when transition data shows that the image is part of a sequence of images, sliding the image into the display synchronized with the speed and direction of the swipe and concurrently synchronized with the speed and direction of the swipe playing a sequence of images, wherein the image is a part of the sequence of images, and blending into an image of the sequence of images as the image is fully on the display; or
    wherein the transition comprises, when the transition data shows that the image is part of a combined image, sliding a larger combined image into the display synchronized with the speed and direction of the swipe until the edge of the image is reached;
  recognizing a swipe gesture of the user with the touch sensitive display; and
  shifting the image shown on the display; wherein the shifting comprises displaying the transition of the first image and of a second image synchronized with the speed and direction of the swipe, wherein the second image is the adjacent images.

10. The method according to claim 9 comprising automatically determining and/or creating a transition for at least two adjacent images, wherein the second image is one of the adjacent images.

11. The method according to claim 9 further comprising capturing an image with a camera unit.

12. The method according to claim 9, further comprising retrieving an existing transition from the memory.

13. The method according to claim 9, wherein displaying the transition comprises sliding the image out of or into the display synchronized with the speed and direction of the swipe.

14. The method according to claim 9, wherein displaying the transition comprises sliding a linked image into the display synchronized with the speed and direction of the swipe and blending into the image as the linked image is fully on the display.

15. The method according to claim 9, wherein displaying the transition comprises sliding an image into the display synchronized with the speed and direction of the swipe and concurrently synchronized with the speed and direction of the swipe adding parts from overlapping images to the image and blending into an image combined from the overlapping images as the image is fully on the display.

16. The method according to claim 9, wherein displaying the transition comprises switching into a map view and zooming in or out of the map and from or to the location the image was captured at and blending to the image as the map view is fully on the display.

17. A computer program product comprising a non-transitory computer-readable medium having computer code stored thereon, which when executed by a processor, causes an apparatus to perform the method of claim 9.

* * * * *